US009188182B2

(12) United States Patent
Park et al.

(10) Patent No.: US 9,188,182 B2
(45) Date of Patent: Nov. 17, 2015

(54) ELECTRO-MECHANICAL BRAKE WITH DIFFERENTIAL GEAR

(71) Applicant: Daegu Gyeongbuk Institute of Science and Technology, Daegu (KR)

(72) Inventors: Tae Sang Park, Daegu (KR); Dong Hwan Shin, Daegu (KR); Sung Ho Jin, Daegu (KR); Jeon Il Moon, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 14/201,928

(22) Filed: Mar. 10, 2014

(65) Prior Publication Data

US 2015/0144438 A1  May 28, 2015

(30) Foreign Application Priority Data

Nov. 26, 2013  (KR) .......................... 10-2013-0144317

(51) Int. Cl.
*F16D 65/14* (2006.01)
*F16D 65/18* (2006.01)
*F16H 48/08* (2006.01)
*F16D 121/24* (2012.01)
*F16D 125/24* (2012.01)

(52) U.S. Cl.
CPC ................ *F16D 65/14* (2013.01); *F16D 65/18* (2013.01); *F16H 48/08* (2013.01); *F16D 2121/24* (2013.01); *F16D 2125/24* (2013.01)

(58) Field of Classification Search
CPC ..... F16D 55/22; F16D 55/224; F16D 55/225; F16D 55/226; F16D 65/18; F16D 65/183; F16D 2121/14; F16D 2121/24; F16D 2125/20; F16D 2125/42; F16D 2125/50
See application file for complete search history.

(56) References Cited

U.S. PATENT DOCUMENTS 5,107,967 A * 4/1992 Fujita et al. .................. 188/72.1
2006/0131115 A1* 6/2006 Han ............................. 188/72.2

FOREIGN PATENT DOCUMENTS

JP         2009052682 A  *  3/2009
KR    10-2009-0130602 A     12/2009

OTHER PUBLICATIONS

Machine translation of JP 2009-052682 (no date).*

* cited by examiner

*Primary Examiner* — Nicholas J Lane
(74) *Attorney, Agent, or Firm* — Revolution IP, PLLC

(57) ABSTRACT

Provided is an electro-mechanical brake with a differential gear which includes a driving unit that generates a rotational force by a power that is selectively applied along with the operation of the brake pedal, a differential gear unit that is connected to the driving unit through a gear and in which a first shaft and a second shaft that are disposed in a straight line, an external braking unit that is connected to the first shaft of the differential gear unit through a gear, and an internal braking unit that is connected to the second shaft of the differential gear unit through a gear.

3 Claims, 5 Drawing Sheets

ELECTRO-MECHANICAL BRAKE WITH DIFFERENTIAL GEAR

CROSS-REFERENCE TO RELATED APPLICATIONS

This application claims the priority of Korean Patent Application No. 10-2013-0144317 filed on Nov. 26, 2013 in the Korean Intellectual Property Office, the disclosure of which is incorporated herein by reference.

BACKGROUND OF THE INVENTION

1. Field of the Invention

The present invention relates to an electro-mechanical brake with a differential gear, and more particularly, to an electro-mechanical brake with a differential gear that is attached to one side of a brake disc provided inside vehicle wheels to selectively reduce or stop rotations of the vehicle wheels along with an operation of a brake pedal by a user and in which when a driving unit that generates a rotational force by a power that is selectively applied along with the operation of the brake pedal by the user is driven, the rotational force of the driving unit is transmitted to a differential gear unit and an external braking unit and an internal braking unit that are connected to the differential gear unit simultaneously provide braking powers to the disc along with the rotation of the differential gear unit.

2. Description of the Related Art

In general, it is well known that a brake serves to decelerate or stop a vehicle by converting kinetic energy of a driving vehicle into heat energy by mechanical friction of a friction material to radiate the heat energy into the air.

In the driving method of generating the mechanical friction, a hydraulic caliper having a hydraulic cylinder and a piston is mostly used in the vehicle. A force by which a driver steps on a brake pedal is amplified through a hydraulic booster, and the amplified hydraulic pressure is transmitted to the hydraulic caliper (a large cross sectional area) attached to each wheel through an oil pipe and a master cylinder having a small diameter (a small cross sectional area).

As a result, the piston is pushed by a force obtained by multiplying the hydraulic pressure transmitted to a slave cylinder of the caliper by a cross sectional area of a caliper cylinder, and the piston moves a pad toward a disc to bring the pad into contact with the disc to generate a large clamping force.

A force obtained by multiplying the clamping force by a frictional coefficient of a contact surface between the pad and the disc is applied to the disc as a braking power. As a result, a small pedal force is converted into a high clamping force to be used for braking.

A hydraulic disc brake system that has been widely used is classified into a disc floating type, a fixed caliper type, and a floating caliper type.

First, since the disc floating type has a structure in which the disc is moved along with the movement of the piston while the caliper is fixed, noise may be caused in the disc, and reliability is poor. Thus, the disc floating type is rarely used.

Further, the fixed caliper type has a structure in which the pad is almost simultaneously clamped to the disc by two pistons on both sides of the disc.

Although the fixed caliper type has high reliability, since a volume is increased, a ventilation property may be poor.

Finally, the floating caliper type has a structure in which a hydraulic piston pressing unit moves an inner pad toward the disc to clamp the inner pad to the disc, a caliper housing slides in an opposite direction to the motion of the inner pad by a repulsive force after the inner pad is clamped against the disc, and an outer pad is pulled toward the disc to clamp and brake both side surfaces of the rotating disc.

Since the floating caliper type has a small number of components, a light weight and an excellent cooling function, the floating caliper type has been used in most vehicles. However, since the inner pad is first clamped in initial braking and the outer pad is operated by the repulsive force, there may occur a difference in wear between the inner pad and the outer pad.

Furthermore, a braking power at an initial brake operation may be insufficient until the outer pad is clamped.

Meanwhile, along with a change to a future vehicle such as a hybrid car, a fuel cell car and an electric car, safety of the vehicle, and a need for an environment-friendly vehicle, there is an increasing need for an electro-mechanical brake (EMB) in which an electric motor is applied to brake wheels instead of an existing hydraulic brake, so that various EMB products have been developed.

The EMB product has a structure in which a hydraulic driving unit (a hydraulic cylinder, a piston) that presses the pad is removed from the existing hydraulic disc brake to be replaced with a motor driving unit (motor, a roller screw, a decelerator), and the disc rotated using the motor as a driving source is braked.

Korean Patent Publication No. 10-2001-0032508 (filed on Apr. 25, 2001) discloses an electro-mechanical wheel brake for a vehicle including an electric motor; an operating device that is driven by the electric motor, converts a rotation driving motion of the electric motor into a linear motion, and has no auto locking function; and an electronic brake having a frictional brake pad that is pressed against a brake main body connected to vehicle wheels from the operating device through the driving of the operating device using the electric motor so as not to be rotated and a first electromagnet for operation. In the electro-mechanical wheel brake for a vehicle, the electric motor and the operating device are respectively fixed to their positions by using the electronic brake, and the electronic brake has a second electromagnet for operation.

Further, Korean Patent Publication No. 10-2009-0130602 (filed on Dec. 24, 2009) discloses a caliper-integrated electronic parking brake including an EPB-ECU that controls driving of a vehicle and receives a signal of an operation button to generate a control signal for parking; a driving assay that includes a decelerator in which an outer ring gear is circumscribed in parallel to a side surface of a gear wheel circumscribed in parallel to a side surface of a driving gear directly receiving a rotational force of a motor being rotated or reversely rotated under the control of the EPB ECU and has an axial force generating gear disposed to pass through the inner space of the outer ring gear in an axial direction to generate an axial-direction driving power for pressing the pad toward the wheel disc, and an integrated housing for accommodating the motor and the decelerator therein; a straight line motion unit that has a screw shaft receiving output torque generated in the driving assay to be moved in a straight line motion back and forth; and a caliper that is provided to surround a wheel disc attached to a vehicle wheel and implements a parking braking state of a vehicle by allowing a piston to press a pad by an axial-direction pressing force applied by a nut and the screw shaft as the straight line motion unit at the time of driving the motor to restrain the wheel disc.

The electro-mechanical parking brake (EPB) has a mechanism similar to the floating caliper type of the hydraulic disc brake.

That is, the EPB has a structure in which the inner pad is moved and clamped using the motor as the driving source and the sliding caliper is moved by the repulsive force after the inner pad is clamped to clamp the outer pad, so that the braking is performed.

The existing hydraulic disc brake and the electro-mechanical brake have basically the same mechanism except that the hydraulic pressure or the motor are respectively used as the driving sources in the existing hydraulic disc brake and the electro-mechanical brake, and the piston or the screw (gear) are respectively used as the driving power transmitting structure in the existing hydraulic disc brake and the electro-mechanical brake.

In other words, the inner pad is first moved and clamped, and the outer pad is clamped by the repulsive force to perform the braking.

In the two mechanisms, there may occur a different in wear between the inner pad and the outer pad in the floating caliper type. Further, it takes a longer time to reach a required braking power due to the operation principle (the caliper is moved to clamp the outer pad by the repulsive force after the inner pad is moved to be clamped) than the fixed caliper type, so that responsiveness may be degraded.

In order to obtain a braking power provided by the existing hydraulic pressure, a driving power transmitting manner such a ball screw method or a screw method having a relatively high deceleration ratio is mostly used in the EMB. Since the screw method has a driving power transmitting efficiency (efficiency: 0.6 to 0.8) lower than that (efficiency: 0.98) of a general spur gear or a helical gear, the screw method needs to select a driving motor of a higher output.

Moreover, since the ball screw method (efficiency: 0.9 or more) has relatively high manufacturing cost, unit cost of components may be increased.

In addition, in order to reduce the entire size of the EMB, the specifications of the motor need to be small. When the specifications of the motor are small, since a final output after gear shifting is performed is decreased, a braking power (1,200 Kgf) for maintaining parking braking and provision of the vehicle and during driving is decreased. For this reason, reliability for performance of the EMB may be degraded.

In addition, when a motor driving power is large, the braking power for maintaining the parking braking is sufficiently generated. However, since the entire size and weight of the EMB are increased due to the motor, the weight of the vehicle may be increased. Accordingly, the attachment may be easily degraded.

Meanwhile, a relatively simple mechanism in which the driving power of the motor is transmitted to a rack and a pinion without a differential gear may be designed.

However, in this case, when the wears of the inner pad and the outer pad are constantly generated, the two pads can be simultaneously clamped.

This is because strokes of the inner pad and the outer pad (distance by which racks are moved from a driving power transmitting shaft) are constantly the same.

That is, when there is a difference in wear between the inner pad and the outer pad, only one pad is first clamped, and a certain portion of the firstly clamped pad is worn. Thereafter, both of the inner pad and the outer pad are clamped. Accordingly, in this case, accurate responsiveness may not be expected.

SUMMARY OF THE INVENTION

An object of the present invention provides an electro-mechanical brake with a differential gear capable of minimizing a difference in wear between an inner pad and an outer pad by almost simultaneously clamping both discs and improving responsiveness at an initial brake operation until the outer pad is clamped by providing one driving source (a driving unit: a motor) and a differential gear unit as a driving power transmitting device in a disc brake braking method of an EMB.

An object of the present invention also provides an electro-mechanical brake with a differential gear having a mechanism capable of improving a driving power transmitting efficiency and having relatively lower manufacturing cost than a ball screw method by using a spur gear (or a helical gear), a rack and a pinion gear as a driving power transmitting device.

According to an aspect of the present invention, there is provided an electro-mechanical brake with a differential gear including a driving unit that generates a rotational force by a power that is selectively applied along with the operation of the brake pedal by the user, a differential gear unit that is connected to the driving unit through a gear and in which a first shaft and a second shaft that are disposed in a straight line to serve as a rotational shaft are rotated in the same direction by the rotational force provided by the driving unit, an external braking unit that is connected to the first shaft of the differential gear unit through a gear to provide a braking power to an outer surface of the disc along with the rotation of the first shaft of the differential gear unit, and an internal braking unit that is connected to the second shaft of the differential gear unit through a gear to provide a braking power to an inner surface of the disc along with the rotation of the second shaft of the differential gear unit. When the driving unit is driven, the rotational force of the driving unit is transmitted to the differential gear unit, and the external braking unit and the internal braking unit that are connected to the differential gear unit simultaneously provide the braking powers to the disc along with the rotation of the differential gear unit.

The differential gear unit may include a ring gear that meshes with a driving gear of the driving unit to be rotated by a rotational force provided by the driving gear, a 'U'-shaped differential gear case that is integrally formed on one surface of the ring gear to be rotated together with the ring gear around a rotational shaft of the ring gear along with the rotation of the ring gear, a pair of differential side gears that is disposed to face each other within the differential gear case to connect one ends of the first shaft and the second shaft that are disposed in a straight line to serve as the rotational shaft of the ring gear, a pair of differential pinion gears that vertically meshes with the pair of differential side gears and is disposed to face each other within the differential gear case, an inner pinion gear that is provided at an outer portion of the first shaft to transmit a rotational force of the first shaft rotated along with the rotation of the ring gear, and an outer pinion gear that is provided at an outer portion of the second shaft to transmit a rotational force of the second shaft rotated along with the rotation of the ring gear.

The external braking unit may include a first driven shaft that includes a first spur gear meshing with the outer pinion gear of the first shaft, and a first driven shaft provided on the other side opposite to the first spur gear, an upper rack that meshes with the first driven gear of the first driven shaft to be selectively moved back and forth along with rotation or reverse rotation of the first driven shaft, and an outer caliper that is integrally formed at one end of the upper rack and is provided with a brake pad coming in contact with the outer surface of the disc to provide a braking power to the outer surface of the disc.

The internal braking unit may include a second driven shaft that includes a second spur gear meshing with the inner pinion gear of the second shaft, and a second driven gear provided on the other side opposite to the second spur gear, a lower rack that meshes with the second driven gear of the second driven shaft to be selectively moved back and forth along with rotation or reverse rotation of the second driven shaft, and an inner caliper that is integrally formed at one end of the lower rack and is provided with a brake pad coming in contact with the inner surface of the disc to provide a braking power to the inner surface of the disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
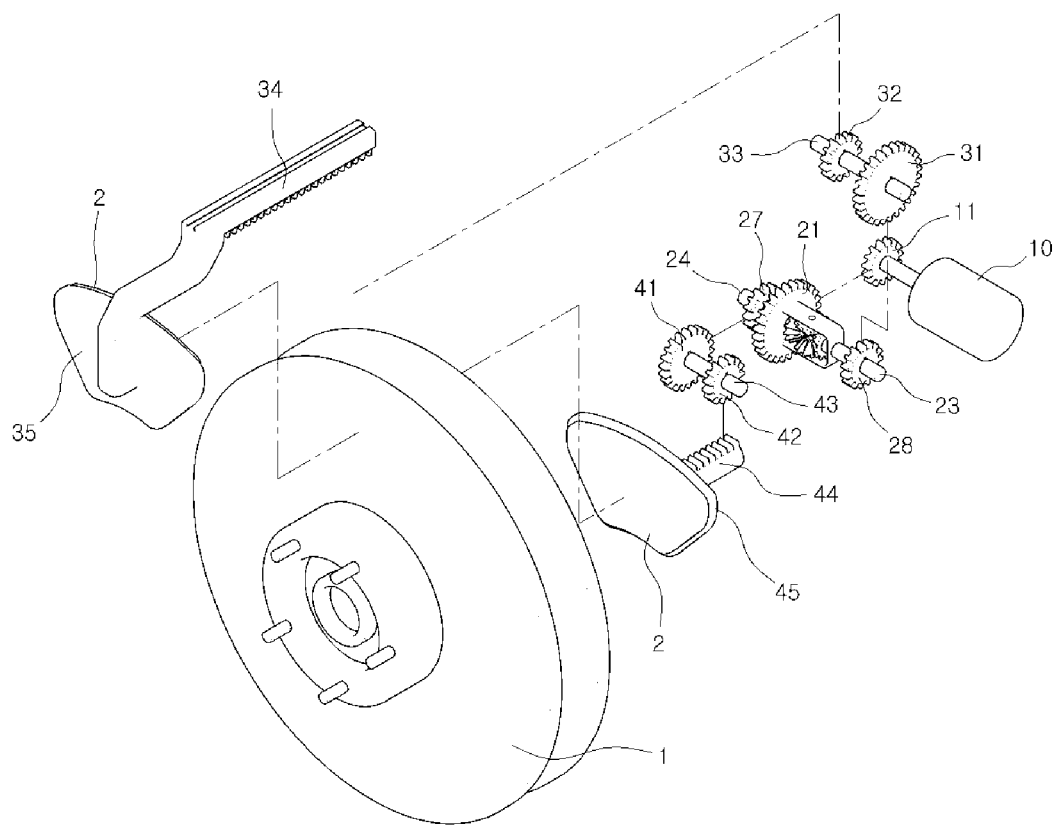
FIG. 1 is an exploded perspective view illustrating a configuration of an electro-mechanical brake with a differential gear according to the present invention.

As set forth above, according to exemplary embodiments of the invention, an electro-mechanical brake with a differential gear has the following effects.

First, since a driving unit (motor) is used as one driving power source and a differential gear is used as a driving power transmitting device for transmitting a braking power to a caliper that generates the braking power, it is possible to minimize differential braking and a difference in wear between an inner pad and an outer pad by simultaneously clamping an outer surface and an inner surface of a disc.

Second, it is possible to improve a braking power at an initial brake operation by almost simultaneously clamping both surfaces of the disc.

Third, when a differential gear unit is used as the driving power transmitting source and a load is first applied to any one braking unit of an external braking unit and an internal braking unit, since a larger rotational force is transmitted to the other braking unit, it is possible to almost simultaneously driving both of the external braking unit and the internal braking unit.

Hereinafter, preferred exemplary embodiments of the present invention will be described in detail with reference to the accompanying drawings. Before the description, terms and words used in the specifications and claims are not interpreted as the meaning generally used in the dictionary, but should be interpreted as the meaning and concept coincident with the technological sprit of the present invention on the basis of a fundamental rule that an inventor can suitably define the concept of corresponding terms to describe his or her invention using the best method.

Accordingly, embodiments described in the specifications and configurations illustrated in the drawings are merely preferred embodiments of the present invention, and do not wholly represent the technical sprit of the present invention. Therefore, it should be appreciated that various modifications and equivalents to these embodiments are possible at the time of filing the present application.

Figure 2:
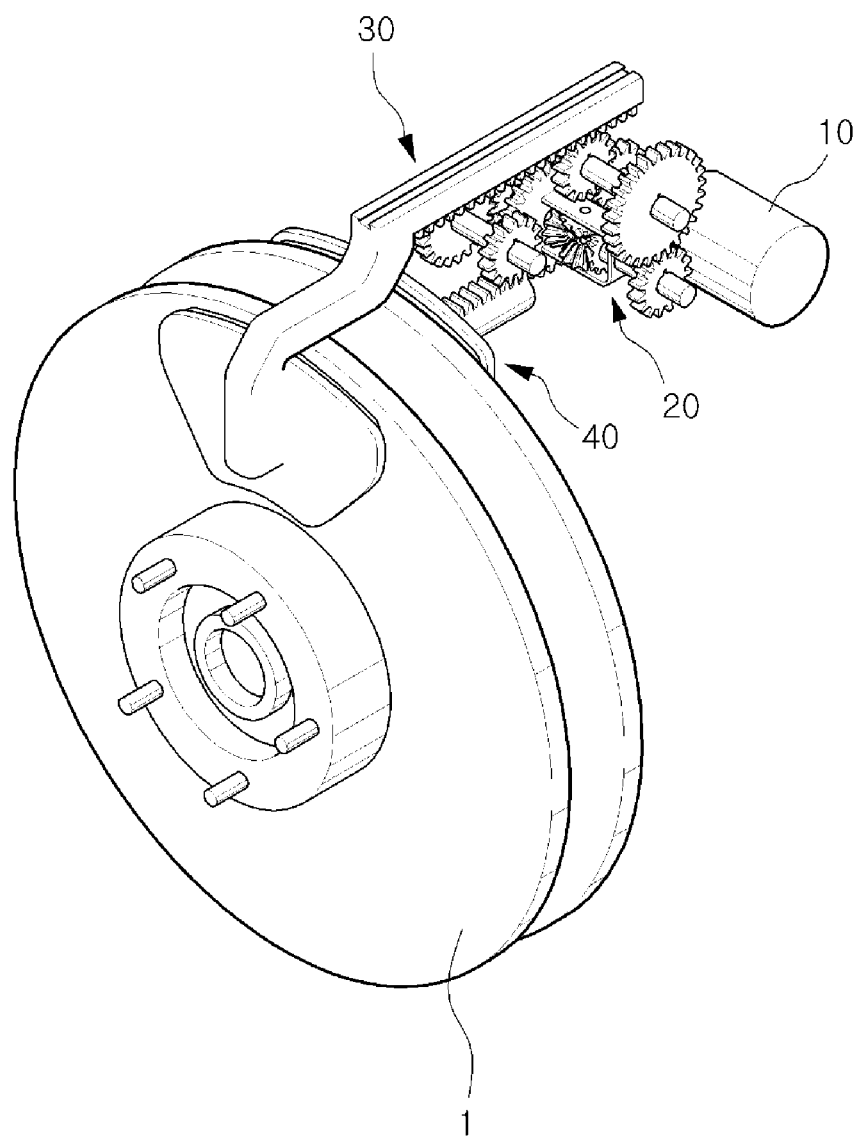
FIG. 2 is an exemplary diagram illustrating a state where the electro-mechanical brake with a differential gear according to the present invention is attached to a disc.
Figure 3:
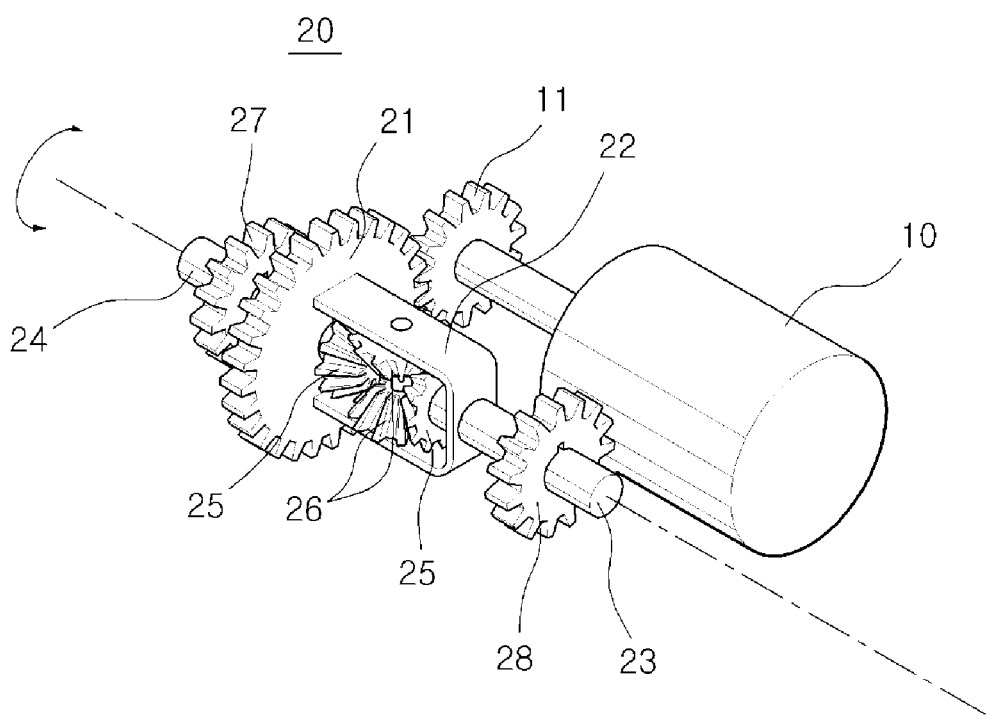
FIG. 3 is an exemplary diagram illustrating a state where a differential gear unit is connected to a driving unit according to the configuration of the present invention.
Figure 4:
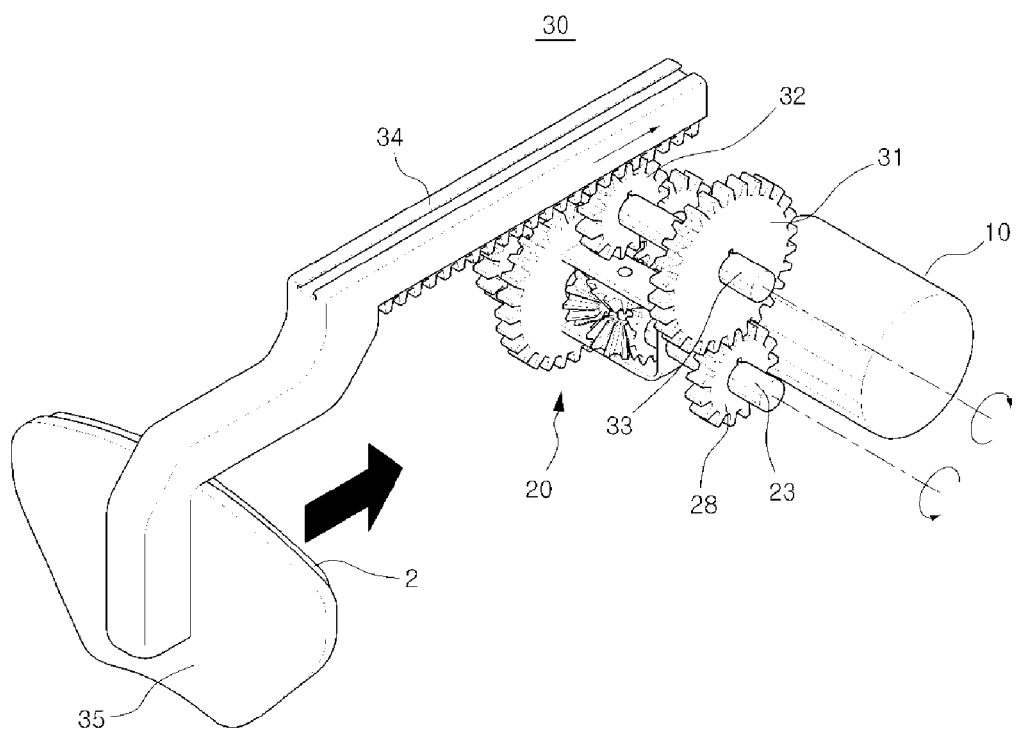
FIG. 4 is an exemplary diagram illustrating an operation state of an external braking unit according to the configuration of the present invention.
Figure 5:
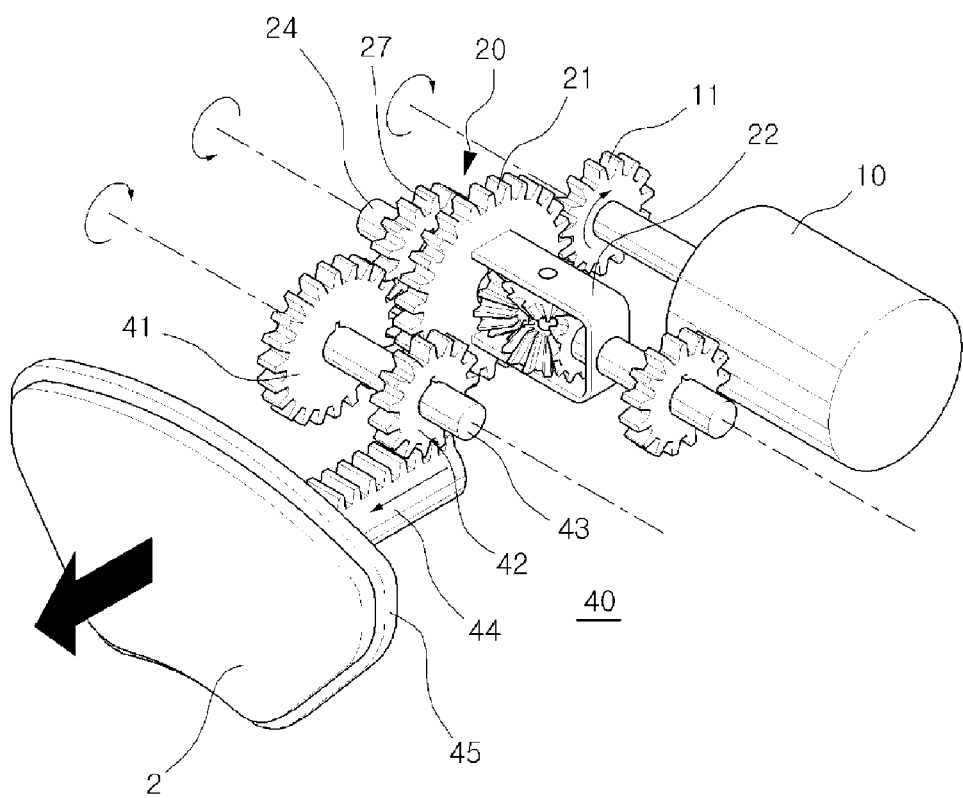
FIG. 5 is an exemplary diagram illustrating an operation state of an internal braking unit according to the configuration of the present invention.

FIG. 1 is an exploded perspective view illustrating a configuration of an electro-mechanical brake with a differential gear according to the present invention, FIG. 2 is an exemplary diagram illustrating a state where the electro-mechanical brake device with a differential gear according to the present invention is attached to a disc, FIG. 3 is an exemplary diagram illustrating a state where a differential gear is connected to a driving unit according to the configuration of the present invention, FIG. 4 is an exemplary diagram illustrating an operation state of an external braking unit according to the configuration of the present invention, and FIG. 5 is an exemplary diagram illustrating an operation state of an internal braking unit according to the configuration of the present invention.

The present invention relates to an electro-mechanical brake with a differential gear, which is attached to one side of a brake disc 1 provided inside vehicle wheels to selectively reduce or stop rotation of the vehicle wheels along with an operation of a brake pedal by a user. The electro-mechanical brake is now described with reference the drawings.

First, referring to FIGS. 1 and 2, the electro-mechanical brake with a differential gear according to the present invention includes a driving unit 10, a differential gear unit 20, an external braking unit 30, and an internal braking unit 40. First, the driving unit 10 generates a rotational force by a power that is selectively applied along with the operation of the brake pedal by the user.

The driving unit 10 may be a general DC motor, or a step motor. The driving unit may be a motor having a large rotational torque so as to be able to apply a large braking power, and may be preferably a motor having a high rotational RPM so as to improve high braking responsiveness.

Further, since the driving unit 10 needs to control a rotating number and a rotating angle depending on an operating degree of the brake pedal by the user, the driving unit 10 may include a separate control module that controls the driving unit 10.

Furthermore, the differential gear unit 20 is connected to the driving unit 10 through a gear, and a first shaft 23 and a second shaft 24 that are disposed in a straight line to serve as a rotational shaft are rotated in the same direction by the rotational force provided by the driving unit 10.

The differential gear unit 20 is now described in more detail with reference to the drawings. Referring to FIGS. 1 and 3, the differential gear unit 20 includes a ring gear 21, a differential gear case 22, the first shaft 23, the second shaft 24, differential side gears 25, differential pinion gears 26, an inner pinion gear 27, and an outer pinion gear 28.

First, the ring gear 21 meshes with a driving gear 11 of the driving unit 10 and is rotated by the rotational force provided by the driving gear 11.

Moreover, the differential gear case 22 having a 'U' shape is integrally formed on one surface of the ring gear 21, and the differential gear case 22 is rotated together with the ring gear 21 around the rotational shaft of the ring gear 21 along with the rotation of the ring gear 21.

In addition, a pair of differential side gears 25 is disposed to face each other within the differential gear case 22 to connect one ends of the first shaft 23 and the second shaft 24 that are disposed in the straight line to serve as the rotational shaft of the ring gear 21.

A pair of differential pinion gears 26 is disposed to face each other within the differential gear case 22, and the pair of differential pinion gears 26 vertically meshes with the pair of differential side gears 25 disposed within the differential gear case 22.

The configuration and operation of the differential gear unit 20 are the same as those of a typical differential gear, and, thus, the operation of the differential gear unit 20 will not be described.

The pinion gears for transmitting rotational forces of the first shaft 23 and the second shaft 24 are respectively provided at outer portions of the first shaft 23 and the second shaft 24 that serve as the rotational shaft of the differential gear unit 20, that is, at portions opposite to the differential side gears 25. The inner pinion gear 27 is provided at the outer portion of the first shaft 23, and the inner pinion gear 27 transmits the rotational force of the first shaft 23 rotated along with the rotation of the ring gear 21 to a gear meshing with the inner pinion gear 27.

The outer pinion gear 28 is also provided at the outer portion of the second shaft 24, and the outer pinion gear 28 transmits the rotational force of the second shaft 24 rotated along with the rotation of the ring gear 21 to a gear meshing with the outer pinion gear.

The rotational forces of the inner pinion gear 27 and the outer pinion gear 28 are transmitted to the internal braking unit 40 and the outer braking unit 30, respectively.

The external braking unit 30 is first described with reference to FIGS. 1 and 4. The external braking unit 30 is connected to the first shaft 23 of the differential gear unit 20 through the gear to provide a braking power to an outer surface of the disc 1 along with the rotation of the first shaft 23 of the differential gear unit 20.

At this time, the external braking unit 30 includes a first driven shaft 33, an upper rack 34, and an outer caliper 35. The first driven shaft 33 includes a first spur gear 31 meshing with the outer pinion gear 28 of the first shaft 23, and a first driven gear 32 provided on the other side opposite to the first spur gear 31.

Further, the upper rack 34 meshes with the first driven gear 32 of the first driven shaft 33 to be selectively moved back and forth along with rotation or reverse rotation of the first driven shaft 33.

Furthermore, the outer caliper 35 is integrally formed at one end of the upper rack 34 and is provided with a brake pad 2 coming in contact with the outer surface of the disc 1 to provide a braking power to the outer surface of the disc 1.

Moreover, the internal braking unit 40 is described with reference to FIGS. 1 and 5. The internal braking unit 40 is connected to the second shaft 24 of the differential gear unit 20 through the gear to provide a braking power to an inner surface of the disc 1 along with the rotation of the second shaft 24 of the differential gear unit 20. The internal braking unit 40 includes a second driven shaft 43, a lower rack 44, and an inner caliper 45.

At this time, the second driven shaft 43 includes a second spur gear 41 meshing with the inner pinion gear 27 of the second shaft 24, and a second driven gear 42 provided on the other side opposite to the second spur gear 41.

In addition, the lower rack 44 meshes with the second driven gear 42 of the second driven shaft 43 to be selectively moved back and forth along with rotation or reverse rotation of the second driven shaft 43.

Further, the inner caliper 45 is integrally formed at one end of the lower rack 44 and is provided with a brake pad 2 coming in contact with the inner surface of the disc 1 to provide a braking power to the inner surface of the disc 1.

An operation of the electro-mechanical brake with a differential gear according to the configuration of the present invention will be described below.

First, when the driving unit 10 is driven by the power that is selectively applied along with the operation of the brake pedal by the user, the rotational force of the driving unit 10 is transmitted to the differential gear unit 20.

At this time, the first shaft 23 and the second shaft 24 of the differential gear unit 20 that serve as the rotational shaft of the differential gear unit 20 are not individually rotated, and when the ring gear 21 meshing with the driving gear 11 of the driving unit 10 rotates, the entire differential gear unit 20 is rotated in a direction opposite to the rotation direction of the driving gear 11.

Accordingly, the external braking unit 30 and the internal driving unit 40 that are connected to the differential gear unit 20 simultaneously provide the braking powers to the disc 1 along with the rotation of the differential gear unit 20.

More specifically, the rotational forces of the outer pinion gear 28 and the inner pinion gear 27 that are respectively provided at the outer portions of the first shaft 23 and the second shaft 24 that serve as the rotational shaft of the differential gear unit 20 are transmitted to the first spur gear 31 and the second spur gear 41 of the external braking unit 30 and the internal braking unit 40 along with the rotation of the entire differential gear unit 20.

The first driven shaft 33 and the second driven shaft 43 are rotated along with the rotations of the first spur gear 31 and the second spur gear 41, and the first driven gear 32 and the second driven gear 42 are rotated along with the rotations of the first driven shaft 33 and the second driven shaft 43. Thus, the upper rack 34 and the lower rack 44 that respectively mesh with the first driven gear 32 and the second driven gear 42 are moved back and forth.

The outer caliper 35 and the inner caliper 45 are moved toward the disc along with the movements of the upper rack 34 and the lower rack 44 back and forth to apply the braking powers to the disc through the brake pads that are respectively provided at the outer caliper 35 and the inner caliper 45.

At this time, when a load of any one of the external braking unit 30 and the internal braking unit 40 is excessively large, a larger rotational force is transmitted to the other braking unit.

Accordingly, the braking powers of the external braking unit 30 and the internal braking unit 40 may be almost simultaneously generated.

The differential gear has the above-stated function, and in the present invention, due to the function, it is possible to prevent a difference in wear between the brake pads from being caused and to improve reliability for a response speed of the brake.

Accordingly, in the present invention, since one driving source (motor) and the differential gear unit are provided as a driving power transmitting device, the outer surface and the inner surface of the disc are almost simultaneously clamped, so that it is possible to minimize the difference in wear between the inner pad and the outer pad. As a result, it is possible to improve a braking power at an initial brake operation until the outer pad is clamped.

Although the present invention has been described in connection with the embodiments illustrated in the drawings, these embodiments have been presented by way of example only. It should be understood to those skilled in the art that various modifications and equivalents to these embodiments are possible. Therefore, the technical scope of the present invention should be fall within the technical spirit of the appended claims.

What is claimed is:

1. An electro-mechanical brake comprising:
a driving unit that generates a rotational force in accordance with a selective application of a brake pedal;
a differential gear unit connected to the driving unit, the differential gear unit comprising a first shaft and a second shaft that are disposed in a straight line to serve as a rotational shaft and are rotated in the same direction by the rotational force provided by the driving unit;
an external braking unit comprising an upper rack and an outer caliper, the upper rack connected to the first shaft of the differential gear unit to provide a braking power to an outer surface of a disc by moving back and forth the outer caliper according to the rotation of the first shaft of the differential gear unit; and
an internal braking unit comprising a lower rack and an inner caliper, the lower rack connected to the second shaft of the differential gear unit to provide a braking power to an inner surface of the disc by moving back and forth the inner caliper according to the rotation of the second shaft of the differential gear unit, wherein
when the driving unit is driven, the rotational force of the driving unit is transmitted to the differential gear unit, and the transmitted rotational force is simultaneously applied to the external braking unit and the internal braking unit that are connected to the differential gear unit to provide the braking powers to the disc by simultaneously moving back and force the outer and inner calipers according to the rotation of the differential gear unit and wherein
the external braking unit further comprises:
a first driven shaft comprising a first spur gear meshing with an outer pinion gear of the first shaft, the first driven shaft provided on a first side of the first spur gear, wherein
the upper rack meshing with a first driven gear of the first driven shaft such that the upper rack is moved back and forth along with rotation or reverse rotation of the first driven shaft, and
the outer caliper is integrally formed at one end of the upper rack and is provided with a brake pad coming in contact with the outer surface of the disc to provide a braking power to the outer surface of the disc.

2. The electro-mechanical brake with a differential gear of claim 1, wherein the differential gear unit comprises:
a ring gear meshing with a driving gear of the driving unit disposed to be rotated by a rotational force provided by the driving gear;
a "U'-shaped differential gear case integrally formed on one surface of the ring gear disposed to be rotated together with the ring gear around a rotational shaft of the ring gear according to the rotation of the ring gear;
a pair of differential side gears disposed to face each other within the differential gear case to connect one end of the first shaft and the second shaft such that the first shaft and the second shaft are disposed in a straight line to serve as the rotational shaft of the ring gear;
a pair of differential pinion gears vertically meshing with the pair of differential side gears, the pair of differential side gears and the pair of differential pinion gears being disposed within the differential gear case;
an inner pinion gear provided at an outer portion of the second shaft to transmit a rotational force of the second shaft rotated according to the rotation of the ring gear; and
the outer pinion gear provided at an outer portion of the first shaft to transmit a rotational force of the first shaft rotated according to the rotation of the ring gear.

3. The electro-mechanical brake with a differential gear of claim 1, wherein the internal braking unit includes:
a second driven shaft comprising a second spur gear meshing with an inner pinion gear of the second shaft, and
a second driven gear provided on the second driven shaft on a first side of the second spur gear, wherein
the lower rack meshing with the second driven gear of the second driven shaft such that the lower rack is moved back and forth along with rotation or reverse rotation of the second driven shaft, wherein
the inner caliper is integrally formed at one end of the lower rack and is provided with a brake pad coming in contact with the inner surface of the disc to provide a braking power to the inner surface of the disc.

* * * * *